(12) United States Patent
Farrar et al.

(10) Patent No.: US 8,260,761 B2
(45) Date of Patent: Sep. 4, 2012

(54) DETECTING PERFORMANCE DEGRADING DESIGN AND ALGORITHM ISSUES IN DATABASE APPLICATIONS

(75) Inventors: Daniel James Farrar, Waterloo (CA); Paul Tonizzo, Guelph (CA)

(73) Assignee: iAnywhere Solutions, Inc., Dublin, CA (US)

( * ) Notice: Subject to any disclaimer, the term of this patent is extended or adjusted under 35 U.S.C. 154(b) by 715 days.

(21) Appl. No.: 11/583,716

(22) Filed: Oct. 20, 2006

(65) Prior Publication Data

US 2008/0098033 A1 Apr. 24, 2008

(51) Int. Cl.
*G06F 7/00* (2006.01)
(52) U.S. Cl. .......................................... 707/705
(58) Field of Classification Search ............... 707/104.1, 707/705
See application file for complete search history.

(56) References Cited

U.S. PATENT DOCUMENTS

| | | | |
|---|---|---|---|
| 6,466,931 B1 * | 10/2002 | Attaluri et al. | 1/1 |
| 6,801,940 B1 * | 10/2004 | Moran et al. | 709/224 |
| 2005/0055673 A1 * | 3/2005 | Dias et al. | 717/127 |
| 2005/0192921 A1 * | 9/2005 | Chaudhuri et al. | 707/1 |

OTHER PUBLICATIONS

Oracle9i Database Performance Turing Guide and Reference, available online at: download-west.oracle.com/docs/cd/B10501_01/server.920/a96533/sqltrace.htm#1018. (first available Sep. 12, 2003).*
Ivan T. Bowman, "Scalpel: Optimizing Query Streams Using Semantic Prefetching PhD Thesis", University of Waterloo, 2001, pp. 1-281.
Yao et al., "Finding and Analyzing Database User Sessions", 10th International Conference on Database Systems for Advanced Applications (DASFAA 2005), Apr. 2005, pp. 1-12.
Doppelhammer et al., "Database Performance in the Real World: TPC-D and SAP/R-3", In Proc. ACM SIGMOD Conference, pp. 123-134, 1997.

* cited by examiner

*Primary Examiner* — Jensen Hu
(74) *Attorney, Agent, or Firm* — Sterne, Kessler, Goldstein & Fox PLLC (57) ABSTRACT

Systems, methods and computer program products for detecting potential architecture and interfacing issues in database applications are described herein. In an embodiment, the invention operates by accessing trace information. The trace information includes database-related information pertaining to interactions of a database application with a production database. The invention detects potential architecture and interfacing issues in the database application by analyzing the trace information. Such architecture and interfacing issues include, but are not limited to, multiple connections simultaneously blocking on the same row of a table, and client-side joins.

36 Claims, 10 Drawing Sheets

Determine whether multiple connections were simultaneously blocked on the same row in a table (Does "hot row" exist?)

DETECTING PERFORMANCE DEGRADING DESIGN AND ALGORITHM ISSUES IN DATABASE APPLICATIONS

BACKGROUND OF THE INVENTION

1. Field of the Invention

The present invention is generally directed to database management systems, and more particularly directed to detecting performance degrading design issues in applications that interact with database management systems.

2. Background Art

Often, the factor most limiting the performance and scalability of many database applications is not the DBMS itself, but the expertise of the application developers. Application architecture and interfacing issues can impose significant penalties on system performance. However, for non-expert designers and programmers, identifying these issues can be difficult.

Tools exist for detecting (to some extent) problems with database schema, and problems with individual database statements. Unfortunately, effective, automated tools for identifying poorly architected database applications and database interfacing issues do not exist.

BRIEF SUMMARY OF THE INVENTION

The present invention is directed to systems, methods and computer program products for detecting potential architecture and interfacing issues in database applications. In an embodiment, the invention operates by accessing trace information. The trace information includes database-related information pertaining to interactions of a database application with a production database. The invention detects potential architecture and interfacing issues in the database application by analyzing the trace information. Such architecture and interfacing issues include, but are not limited to, multiple connections simultaneously blocking on the same row of a table, and client-side joins.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to systems, methods and computer program products for detecting performance degrading design issues and algorithm problems in software applications that interact with database management systems (DBMS). Such database application design issues and algorithm problems are also herein referred to as database application architecture and interfacing issues.

Figure 1:
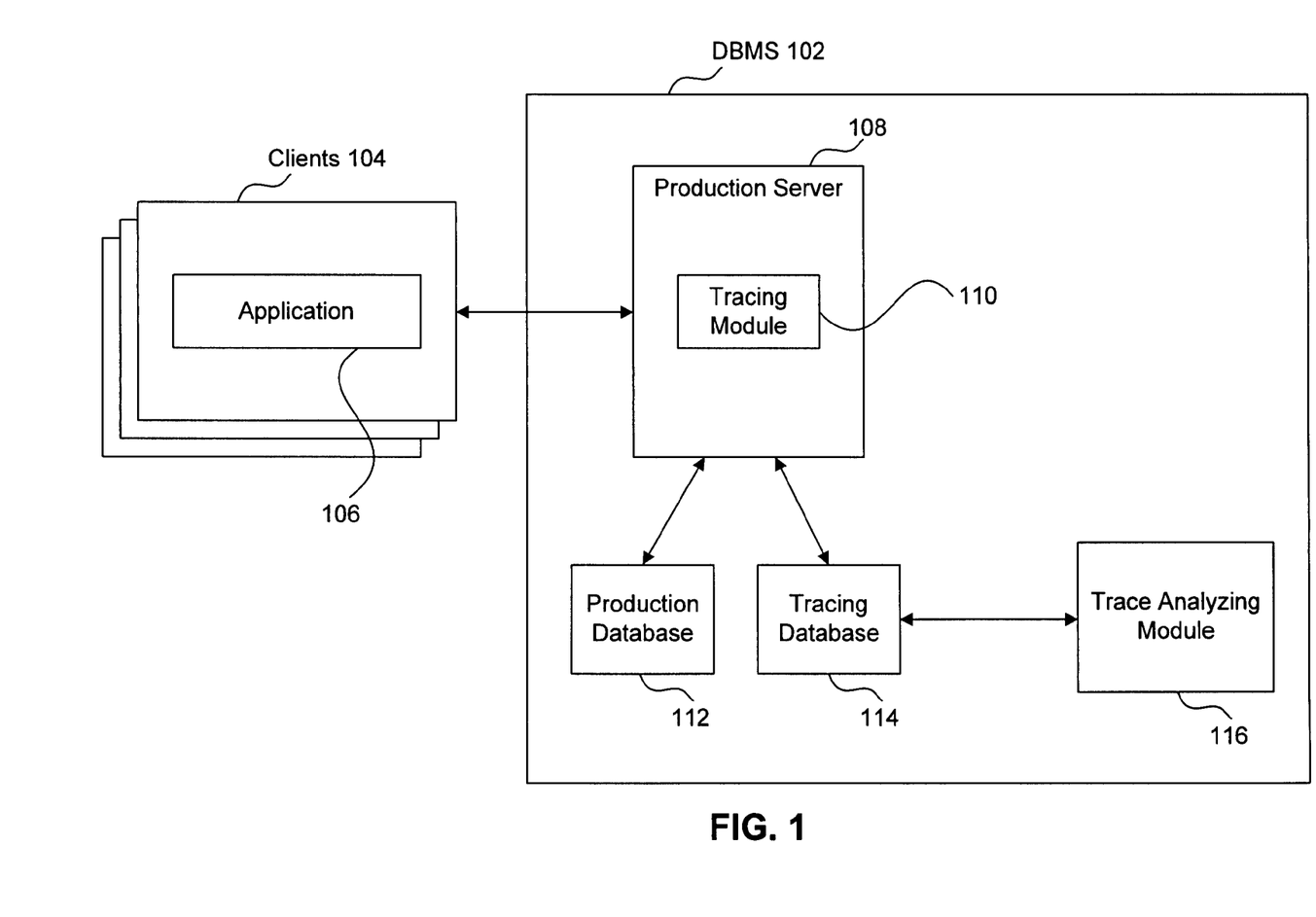
FIG. 1 illustrates a database management system (DBMS) according to an embodiment of the invention.

FIG. 1 illustrates a DBMS 102 that includes a production server 108 and a production database 112. DBMS 102 interacts with a plurality of clients 104. Software application 106 in client 104 accesses information in the production database 112 by interacting with production server 108 in a well known manner. For example, application 106 may issue well known SQL queries to production server 108.

DBMS 102 also includes a tracing module 110, a tracing database 114 and a trace analyzing module 116. It should be understood that the invention is not limited to the example structure shown in FIG. 1. For example, tracing module 110 may be distinct from production server 108. Also, tracing database 114 may be part of production database 112 or another database, or may be external to DBMS 102. Further, trace analyzing module 116 may be external to DBMS 102. Other configurations will be apparent to persons skilled in the relevant art(s).

The tracing module 110 captures and records trace data (also called profiling data) pertaining to interactions with the production database 112. Tracing module 110 stores the trace data in the tracing database 114. According to an embodiment of the invention, tracing module 110 captures and records trace data only when instructed (where such instruction may originate from a computer application or a human operator).

Trace data includes, but is not limited to, the database-related information and events shown in Table 1. In practice, the trace data captured in any given DBMS is implementation and/or application specific, and accordingly may include one or more of the items listed in Table 1, as well as other well known database-related information and events.

TABLE 1

Example Trace Data

Connections:
    Connection number
    Connection name
    User name
    Comm link (what network protocol did they use to connect)
    Node address (what machine did they connect from)
    AppInfo string (did they give this connection a name?)
Statements:
    Database object (if this statement is part of a database object like a stored procedure,
what is the ID of the object)
    Line number (if this statement is part of a stored procedure, what line number is it on)
    Signature (the hash value computed by removing constant values from the SQL
statement)
    The text of the statement
Queries:
    (A query is a SELECT, INSERT, UPDATE, or DELETE statement)
    Statement id (the SQL statement in the Statements table)
    The time the server started processing the query
    Cache size at the time the query was optimized
    Optimization goal, optimization level, user estimates, optimization workload
    (these are database options; the value at optimization time is stored)
    Available requests, active requests, max_tasks
    (these count the number of database threads in various states when the query
    was optimized)
    Used bypass (was the query optimized by the optimizer)
    Estimated cost (the cost estimated by the optimizer to execute the query)
    The short- and long-form text representing the query plan used
    The SQL rewritten as part of the optimization process (if available)
Cursors:
    Query id (the query for which this cursor was opened)
    Isolation level at which the cursor was opened
    flags (internal settings used for this cursor)
    The number of forward, reverse, and absolute fetches done with this cursor
    The time to fetch the first row and all rows
    The plan used by this cursor
Requests:
    (A request is logged any time the server must respond to a client)
    Start and finish time, and the elapsed time (duration), for the server to
    respond to this request
    Connection that issued the request
    If the request was to prepare a statement, execute a query, or open a cursor,
    the ID of the relevant object
    The error code returned by this request
Blocks:
    The name of the lock that this connection blocked while attempting to acquire
    (if the lock was a table-level and not row-level lock)
    The cursor (if available) or request that prompted this attempted lock
    The ID of the table containing this row
    The ROWID of the row that we tried to lock
    The time the block happened and when it ended (that is, when the original owner
    of the lock gave it up and we acquired id)
    The connection that blocked us
Deadlocks:
    (A deadlock happens when multiple connections are blocked on each other in a
    cycle. For example, if A has row 1 locked and wants row 2, and B has row 2
    locked and wants row 1, then A is blocked on B, B is blocked on A;
    neither connection will get the lock it wants, and the connections are
    deadlocked.)
Host variables:
    The values of host variables are captured. Host variables are placeholders
    so that a SQL statement can be parsed without knowing the constant ("parameter")
    values ahead of time.
Internal variables:
    The values of internal SQL variables are also captured.
Cache contents:
    A periodic sampling of the number of pages of each table in memory
Statistics:
    A periodic sampling of the values of performance counters maintained
    by the database
Optimization logging information:
    Details on strategies considered by the query optimizer to execute
    a given query.

Trace analyzing module 116 analyzes the trace data in the tracing database 114 to detect performance degrading design issues and algorithm problems in software applications that interact with the DBMS 102. Such operation of trace analyzing module 116 is depicted in flowchart 202 of FIG. 2, which shall now be described with regard to detecting design issues and algorithm problems in application 106 of client 104.

Figure 2:
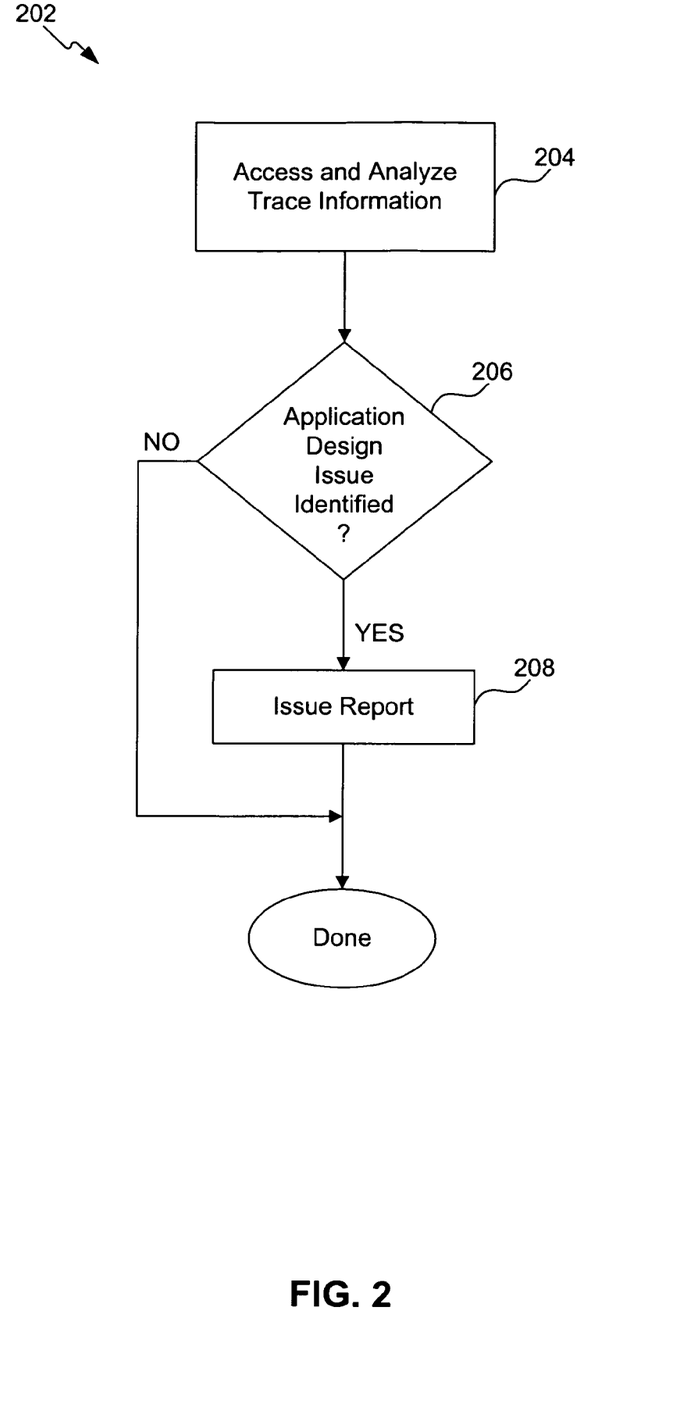
FIG. 2 illustrates a flowchart representing a method for detecting potential architecture and interfacing issues in database applications, according to an embodiment of the invention.

In step 204, trace analyzing module 116 accesses and analyzes trace data in the tracing database 114 to determine whether potential design issues and algorithm problems exist in software application 106. Potential design issues and algorithm problems include, for example, multiple connections blocking on the same row, and client-side joins. These examples are described Sections 2 and 3, below. However, these examples are provided herein for purposes of illustration, not limitation. Other DBMS application-related design issues and algorithm problems will be apparent to persons skilled in the relevant art, and the scope of the invention includes those additional design issues and algorithm problems.

If a potential design issue and algorithm problem is detected in application 106 (as determined in step 206 based on the analysis of step 204), then in step 208 the trace analyzing module 116 issues a report or notification documenting such detection. Such report/notification may be issued to an administrator of DBMS 102, to client 104, and/or any other interested party. Step 208 is described in greater detail in Sections 2 and 3, below.

2. Multiple Connection Blocking

Figure 3:
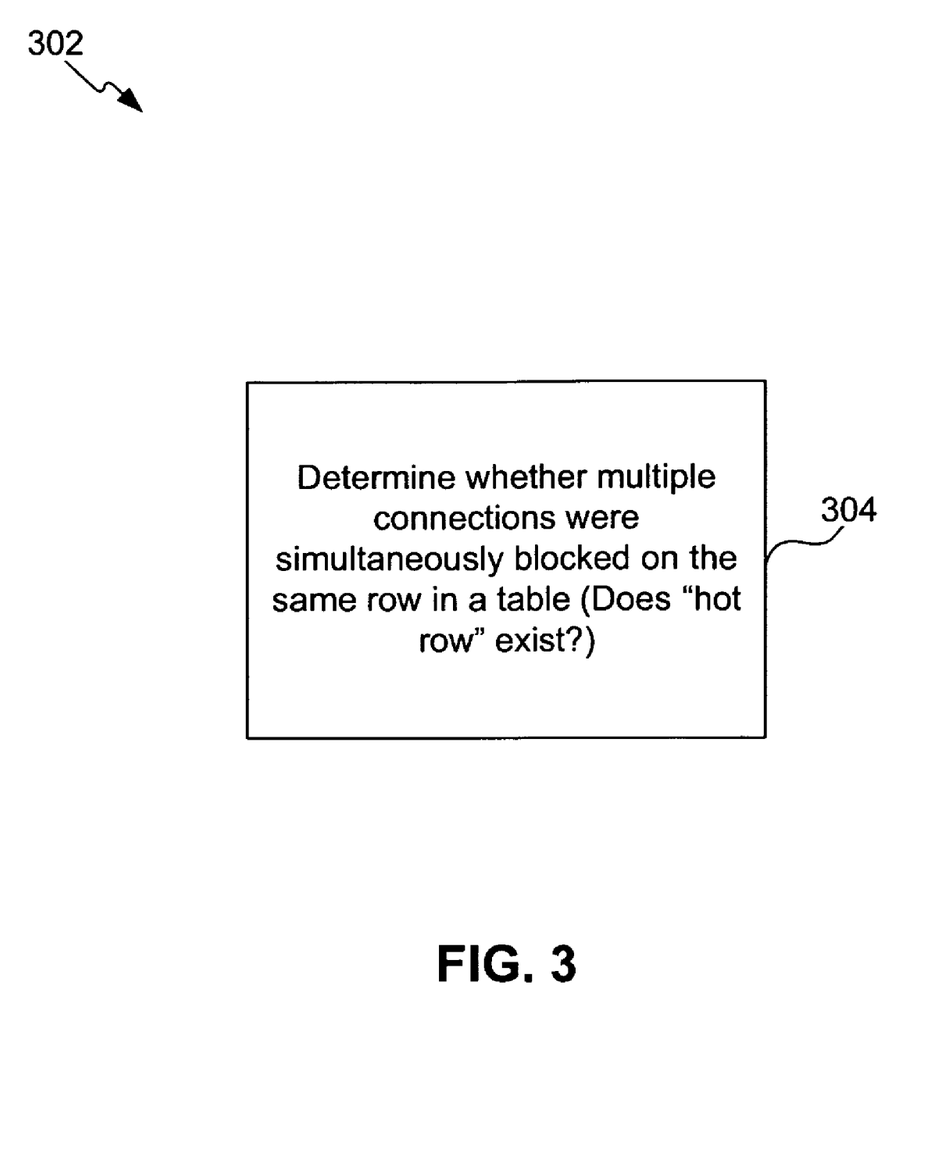
FIGS. 3 and 4 illustrate flowcharts representing methods for detecting simultaneous blocking of multiple connections on the same row of a database table, according to an embodiment of the invention.

According to an embodiment of the invention, the trace analyzing module 116 in step 204 of FIG. 2 detects multiple connections simultaneously blocked on the same row of a table in the production database 112. In other words, and as represented by step 304 of FIG. 3, the trace analyzing module 116 detects "hot rows," where a hot row is a row of a table on which multiple connections are blocked at the same time. Multiple connections blocking on the same row degrade performance, because time is spent while connections are blocked (also, deadlock situations can develop, which can substantially degrade performance).

Figure 4:
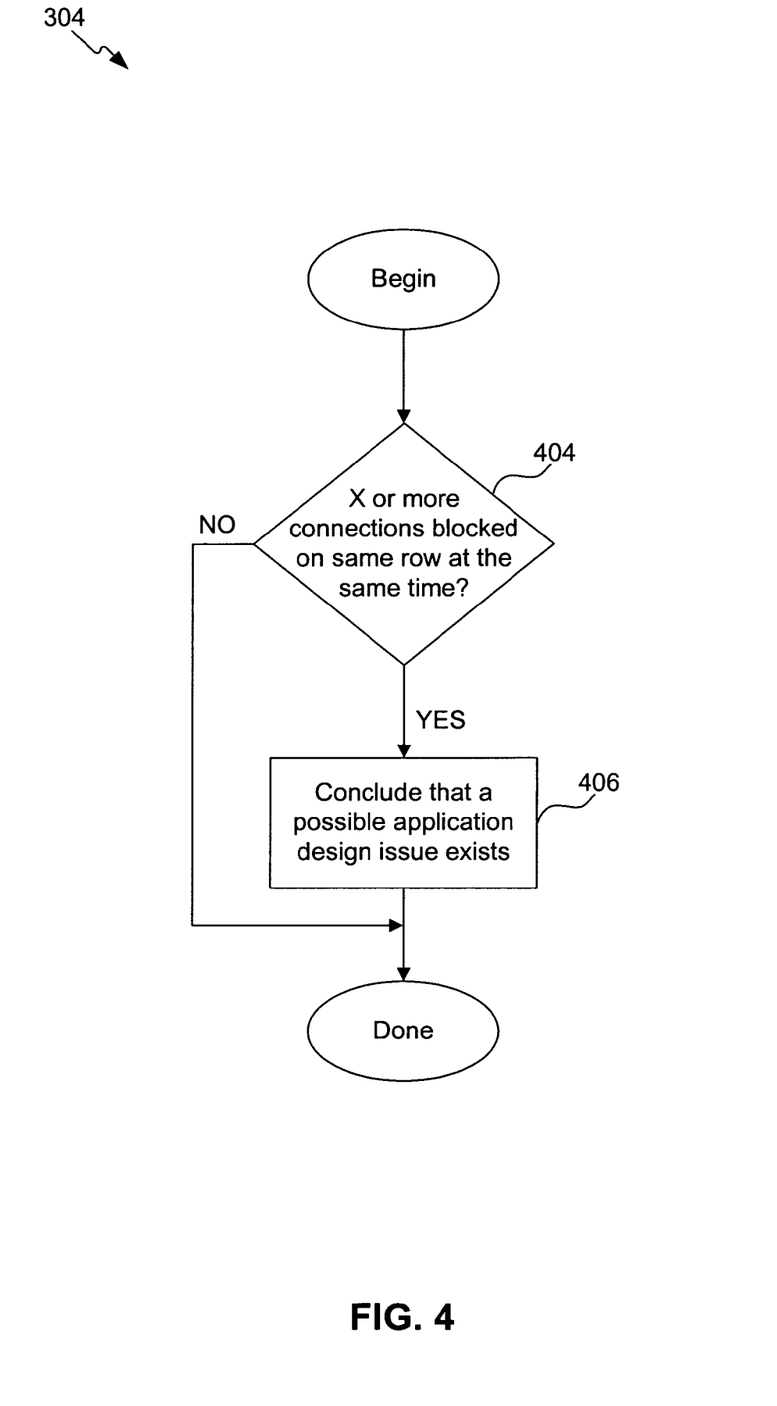

An embodiment for implementing step 304 is shown in FIG. 4, which shall now be described.

In step 404, trace analyzing module 116 determines whether X or more connections were simultaneously blocked on a row of a table in production database 112. Trace analyzing module 116 performs step 404 by reviewing the trace data in the tracing database 114. For example, trace analyzing module 116 may perform step 404 by reviewing the "Blocks" trace data items shown in Table 1.

In an embodiment, X is equal to two, although in other implementations X may be other values.

If it is determined in step 404 that X or more connections were simultaneously blocked on the same row, then in step 406 the trace analyzing module 116 concludes that a possible application design issue and algorithm problem exists. Such conclusion causes the decision step 206 (FIG. 2) to return "True," thereby causing the trace analyzing module 116 to issue a report in step 208.

According to an embodiment of the invention, the report includes three parts: (1) an identification of the potential application design issue and algorithm problem; (2) suggestions for solving the potential application design issue and algorithm problem; and (3) information identifying the code in the application 106 associated with causing the potential application design issue and algorithm problem. An example report is shown in Table 2.

TABLE 2

Example Report/Notification for Multiple Connection Blocking Error

A situation has been detected in which multiple connections were simultaneously blocked on the same row in a table. This likely means that one connection had updated a value in this row, and other connections were trying to update the same value at the same time. This situation can also occur if queries at isolation level one or higher try and read a row that has been updated by another connection at the same time.
You should evaluate the queries and/or update statements that were part of this block. This situation may indicate a concurrency bottleneck for your application. You should evaluate whether there is a way to avoid having multiple connections trying to update a single value in this way.
An example of a case when this situation may arise is if a single row in a table is being used to generate a primary key (for example, a connection increments the value of a certain column and takes that new value as a primary key for use in another statement). This represents a major concurrency problem, since only one connection can get a primary key at a time, and all other connections that try to do so will be blocked until the first connection commits its update. This is best resolved using the DEFAULT AUTOINCREMENT specification on primary keys. See also the documentation for GLOBAL AUTOINCREMENT and @@identity.
Record id of the row on which a block happened: 73851
List of connection numbers blocked on this row at the same time: 19, 21, 22
List of request_ids of statements that blocked on this row: 4025, 5168, 5188
Beginning time of overlapping blocks: 2006-08-08 10:02:15.205
End time of overlapping blocks: 2006-08-08 10:05:31.922

3. Client-Side Join

Figure 5:
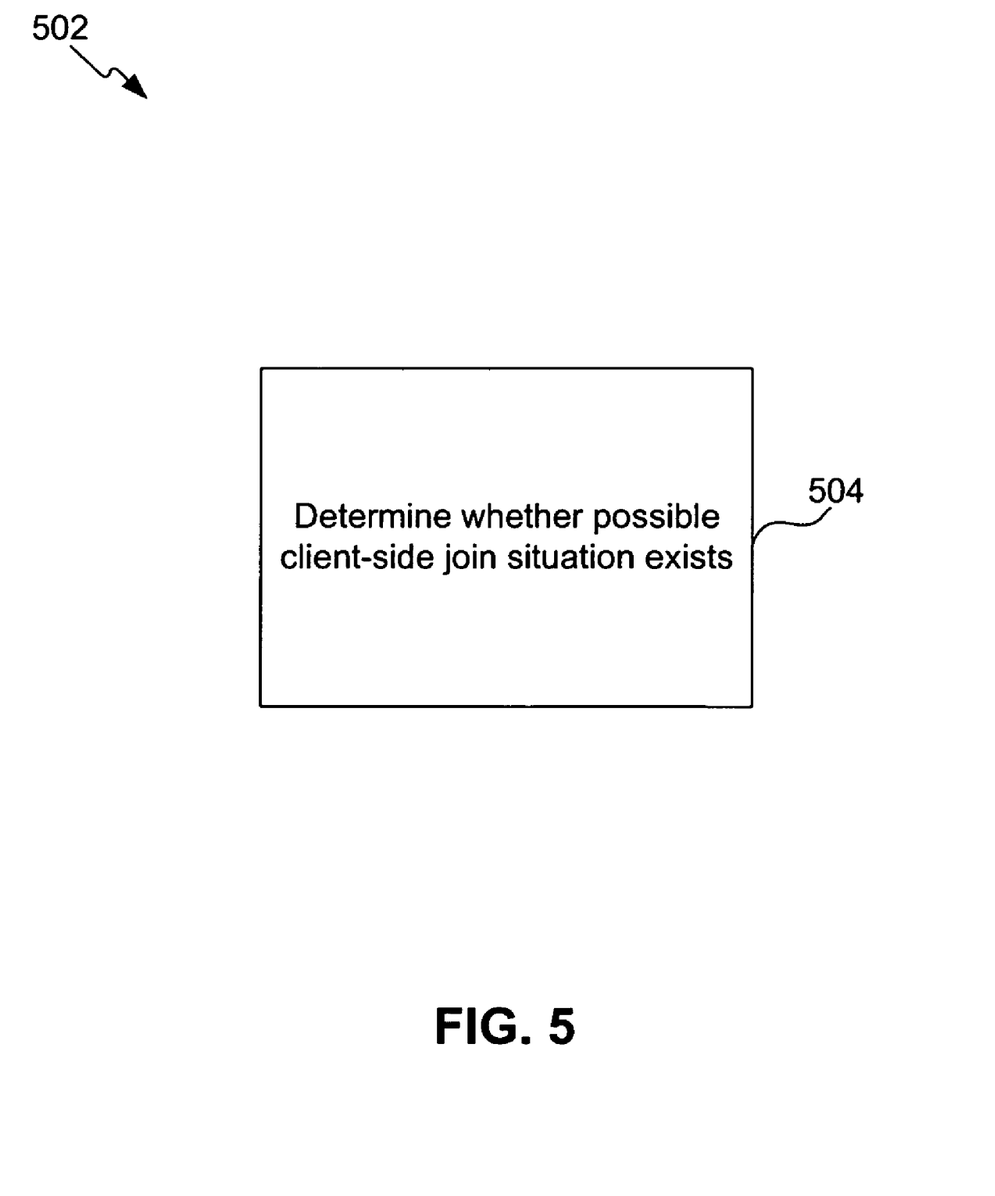
FIGS. 5 and 7 illustrate flowcharts representing methods for detecting potential client side joins, according to an embodiment of the invention.

According to an embodiment of the invention, the trace analyzing module 116 in step 204 of FIG. 2 detects possible client-side joins. Such operation is represented by step 504 in FIG. 5.

A client-side join occurs when an application executes the equivalent of a join within its own code. For example, the application fetches a list of customers, and then fetches all the orders for each customer in the list by issuing a series of separate queries. Client-side joins degrade performance because they increase (sometimes substantially) the amount of traffic between the application 106 and the DBMS 102.

Figure 6A:
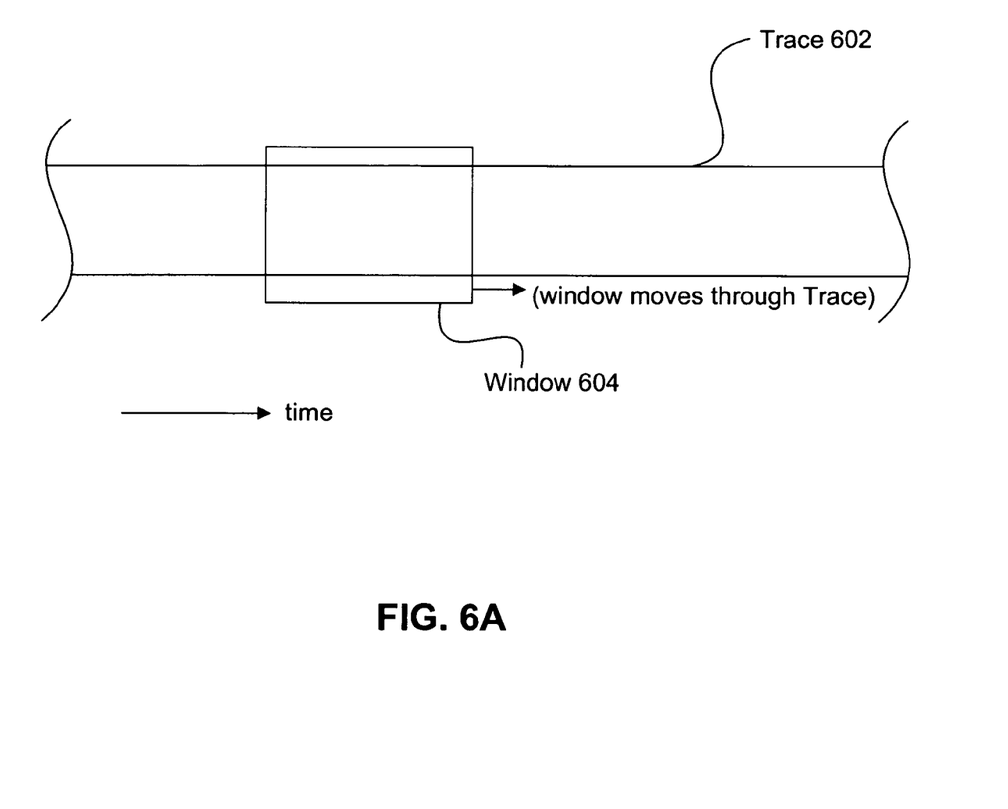
FIGS. 6A and 6B conceptually illustrate operation of the methods of FIGS. 5 and 7, according to embodiments of the invention.
Figure 7:
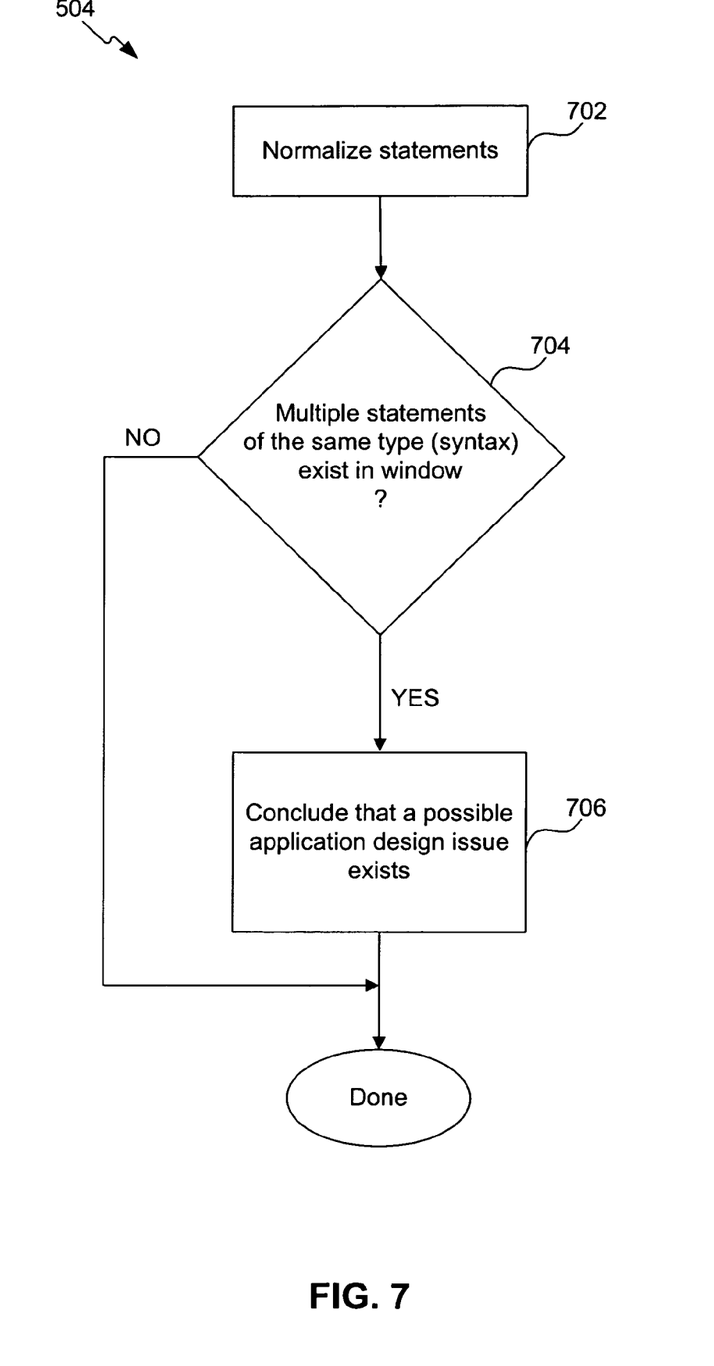

According to an embodiment of the invention, and as conceptually illustrated in FIG. 6A, trace analyzing module 116 detects possible client-side joins by analyzing the trace 602 to detect identical or almost-identical queries or insert/update/delete statements issued by the same connection in a window of time 604. An embodiment for implementing such operation is shown in FIG. 7, which shall now be described.

Figure 8:
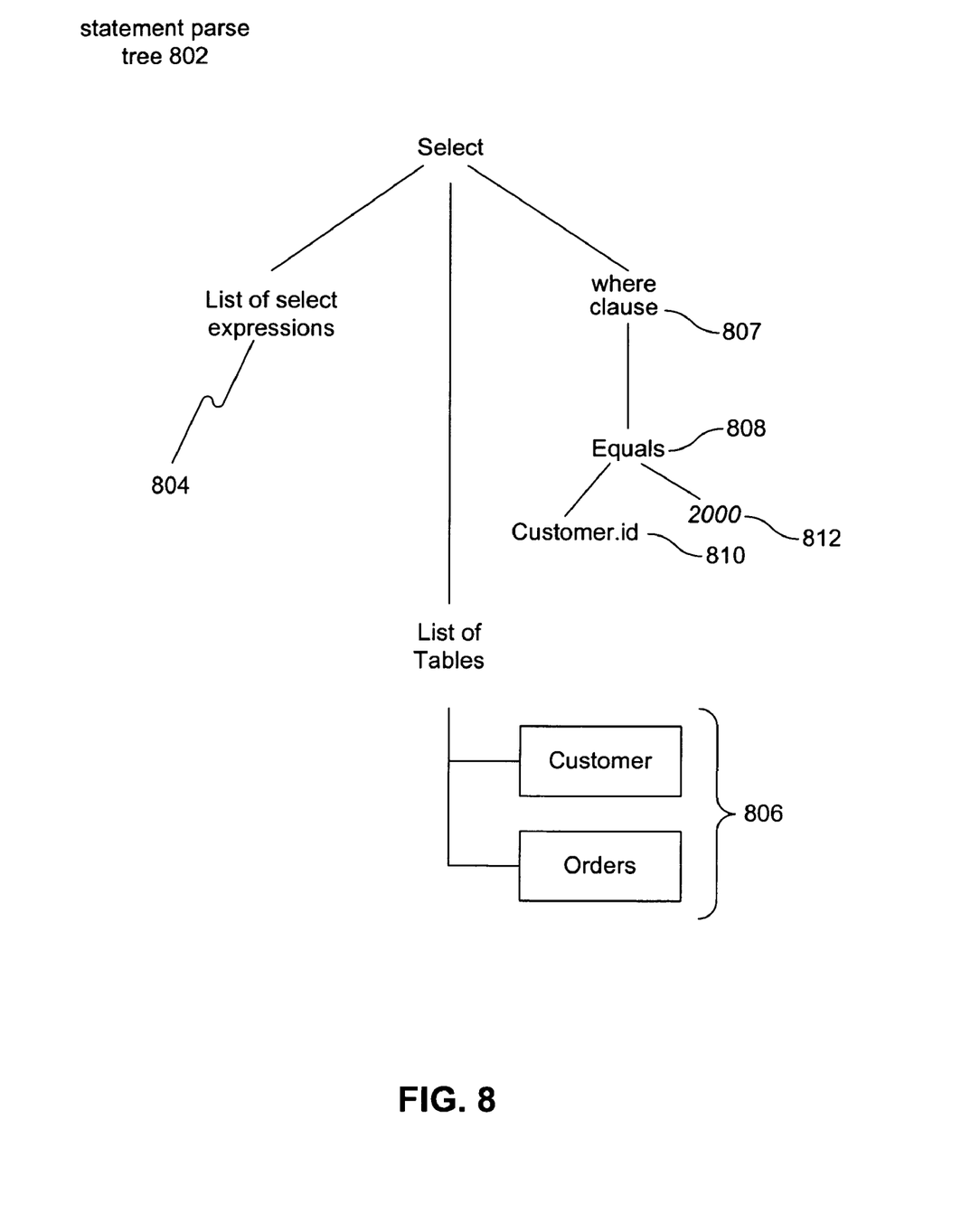
FIG. 8 illustrates a statement parse tree used to describe how statements are normalized according to an embodiment of the invention.

In step 702, statements in the trace 602 are normalized. According to an embodiment, step 702 is achieved by assigning a numeric value to each non-constant component of every statement. (Constant components are literal strings and numbers. Accordingly, non-constant components are all statement components other than literal strings and numbers.) For example, FIG. 8 illustrates an example statement parse tree 802 for a select statement. In this example, the non-constant components include the list of select expressions 804, the list of tables 806 and the where clause 807 (including the check for equality 808 and the column name 810. Each of these items is assigned a numeric value. Constant components, such as the value 2000 (indicated by reference number 812), are not assigned numeric values.

These numeric values are applied as inputs to a hash function, and the resulting hash value represents the signature of the statement. Since only non-constant statement components are considered when generating this hash value, statement signatures reflect the high level structure, or syntax, of statements. Accordingly, statement signatures can be compared to identify identical or almost-identical statements. Other approaches for generating statement signatures will be apparent to persons skilled in the relevant art(s), including, but not limited to, adding the numeric values together.

Step 702 may be performed at analysis time by trace analyzing module 116 (potentially aided by tracing module 110), or may have been previously performed by tracing module 110 as it captured and recorded trace information.

Figure 6B:
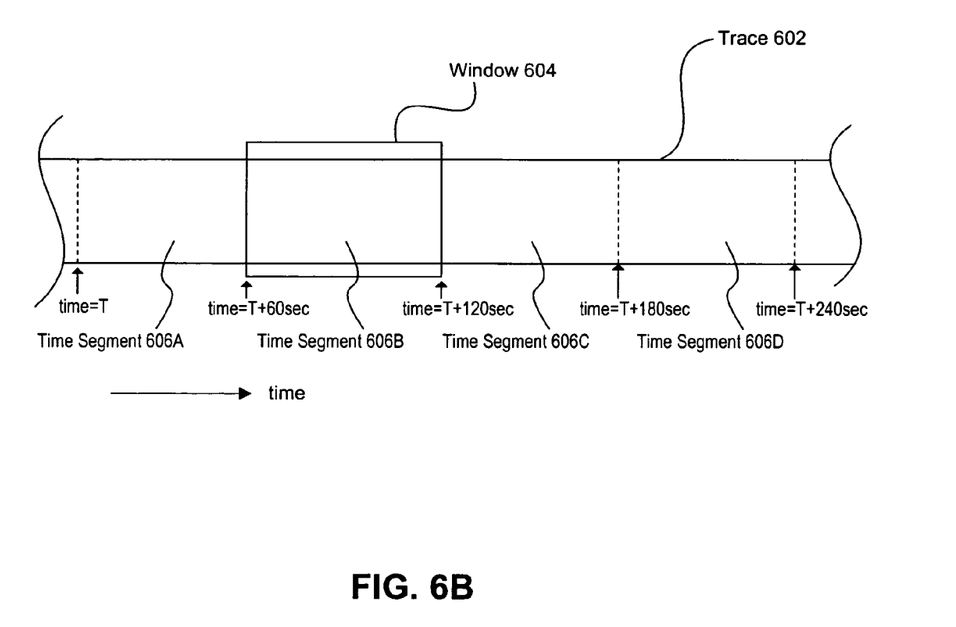

In step 704, trace analyzing module 116 analyzes trace 602 to determine whether M or more identical or almost-identical statements were issued by the same connection in a window of time 604. As shown in FIG. 6A, in an embodiment, window 604 is a sliding window that moves through trace 602. In an alternative embodiment, shown in FIG. 6B, trace 602 is divided into time segments 606 (preferably 60 second time segments, although the invention is not limited to this example implementation), and window 604 moves from one time segment 606 to the next.

In an embodiment, M is equal to 30, and the length of the window of time 604 is 60 seconds. However, the value of M and the length of the window of time 604 are implementation dependent, and the scope of the invention includes other values for these parameters.

If it is determined in step 704 that M or more identical or almost-identical statements were issued by the same connection in a window of time 604, then in step 706 the trace analyzing module 116 concludes that a possible application design issue and algorithm problem exists. Such conclusion causes the decision step 206 (FIG. 2) to return "True," thereby causing the trace analyzing module 116 to issue a report in step 208.

According to an embodiment of the invention, the report includes three parts: (1) an identification of the potential application design issue and algorithm problem; (2) suggestions for solving the potential application design issue and algorithm problem; and (3) information identifying the code in the application 106 associated with causing the potential application design issue and algorithm problem. An example report is shown in Table 3.

TABLE 3

Example Report/Notification for Client-Side Join Error

Many almost-identical queries or insert/update/delete statements were issued by the same connection in a short period of time. This may indicate the presence of a client-side join.\nA client-side join occurs when an application does the equivalent of a join within its own code. For example, the application fetches a list of customers and then fetches all the orders for each customer in the list by issuing a separate query.
You are likely to achieve better performance by restructuring this set of queries as a single query or statement. Doing so will decrease (possibly substantially) the amount of traffic between the application and the database. Additionally, the database system will be able to optimize the query to achieve a lower total execution time.
Connection number: 17
Number of times variants of the statement were executed in a cluster: 240
First time at which this cluster of statements was detected: 2006-08-08 10:30:52.102
Last time at which this cluster of statements was detected: 2006-08-08 10:31:19.756
SQL text of at least one statement that was found clustered on this connection:
SELECT * FROM SALES_ORDER_ITEMS SOI KEY JOIN CUSTOMER C
WHERE SOI.ID = 2000

4. Example Computer Implementation

Figure 9:
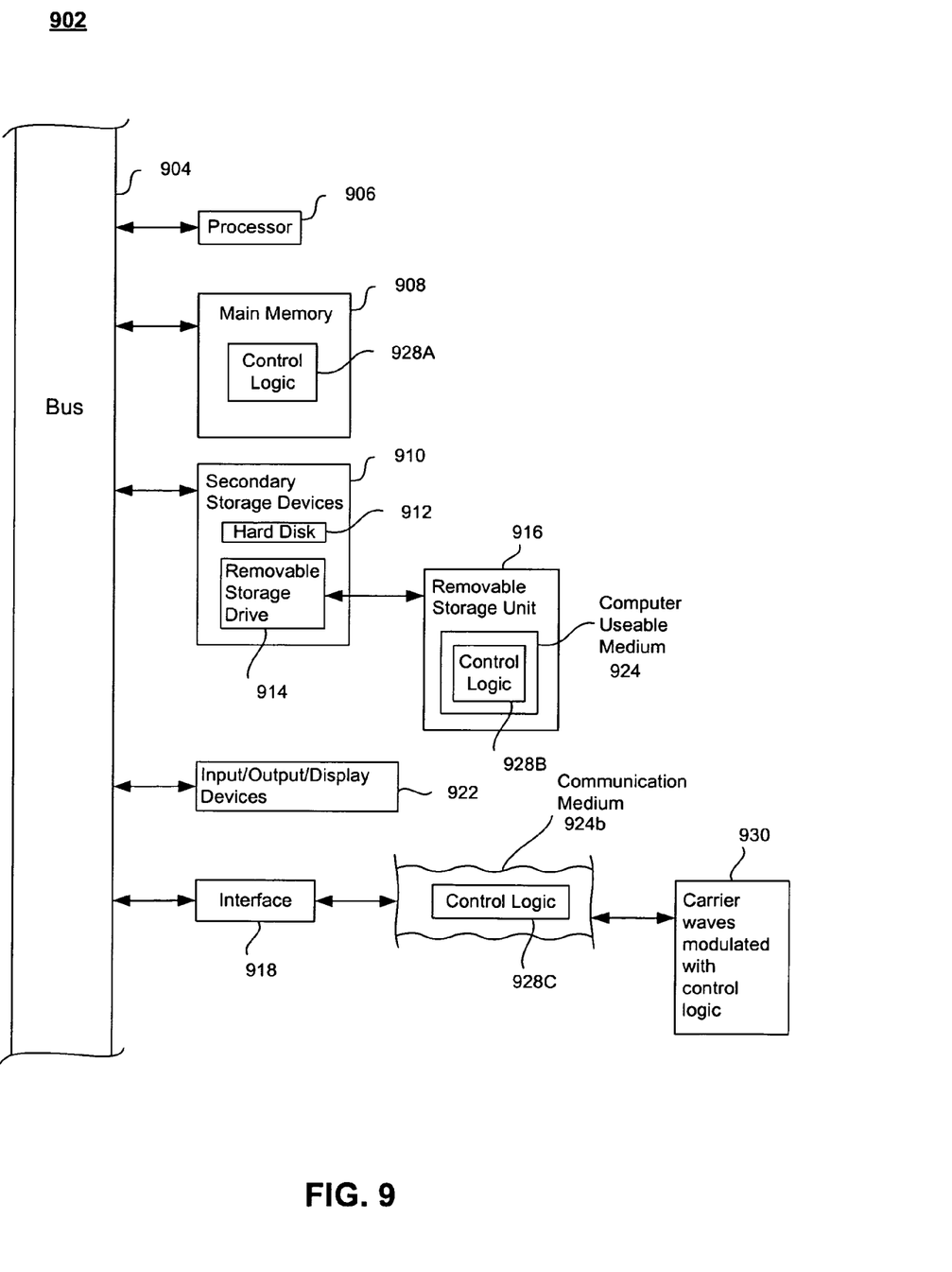
FIG. 9 illustrates an example computer system useful for implementing components of the invention, according to an embodiment of the invention.

In an embodiment of the present invention, the system and components of the present invention described herein are implemented using well known computers, such as a computer 902 shown in FIG. 9. The computer 902 can be any commercially available and well known computer capable of performing the functions described herein, such as computers available from International Business Machines, Apple, Sun, HP, Dell, Compaq, Digital, Cray, etc.

The computer 902 includes one or more processors (also called central processing units, or CPUs), such as a processor 906. The processor 906 is connected to a communication bus 904.

The computer 902 also includes a main or primary memory 908, such as random access memory (RAM). The primary memory 908 has stored therein control logic 928A (computer software), and data.

The computer 902 also includes one or more secondary storage devices 910. The secondary storage devices 910 include, for example, a hard disk drive 912 and/or a removable storage device or drive 914. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 928B (control logic) and/or data. Removable storage unit 916 represents a floppy disk, magnetic tape, compact disk, DVD, optical storage disk, memory stick, or any other computer data storage device. The removable storage drive 914 reads from and/or writes to the removable storage unit 916 in a well known manner.

The computer 902 also includes input/output/display devices 922, such as monitors, keyboards, pointing devices, etc.

The computer 902 further includes a communication or network interface 918. The network interface 918 enables the computer 902 to communicate with remote devices. For example, the network interface 918 allows the computer 902 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 902 via the communication medium 924B. More particularly, the computer 902 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 902, the main memory 908, the hard disk 912, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

5. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of detecting potential architecture and interfacing issues in a database application, comprising:
    accessing trace information that comprises database-related information pertaining to interactions of said database application with a production database;
    dividing said trace information into a plurality of segments, wherein each segment represents a time duration corresponding to a window of time;
    analyzing statement signatures of statements in each segment within the window of time said segments to determine whether identical or substantially-identical statements were are issued by a connection in the window of time, wherein the window moves from one segment to the next during one or more of said segments, and said statement signatures are computed by assigning numerical values to non-constant statement components and applying said numerical values to a hashing function; and
    determining potential architecture and interfacing issues in said database application based on said analyzing.

2. The method of claim 1, further comprising:
    issuing a report when a potential architecture and interfacing issue is detected, wherein said report comprises:
    a first part that identifies said detected potential architecture and interfacing issue;
    a second part that includes suggestions for solving said detected potential architecture and interfacing issue; and
    a third part that comprises information identifying code in said database application associated with said detected potential architecture and interfacing issue.

3. The method of claim 1, wherein said analyzing step comprises:
    determining whether multiple connections were simultaneously blocked on a row of a table in said production database.

4. The method of claim 3, wherein said determining step comprises:
    determining whether at least X connections were simultaneously blocked on said row; and
    if it is determined that at least X connections were simultaneously blocked on said row, then concluding that a potential architecture and interfacing issue exists.

5. The method of claim 4, wherein X is greater than 1.

6. The method of claim 1, wherein said analyzing step comprises:
    determining whether a possible client-side join situation exists.

7. The method of claim 1, wherein said potential architecture and interfacing issues exist when it is determined that at least M identical or substantially-identical statements were issued by said connection during said one or more of said segments.

8. The method of claim 7, wherein M is equal to 30, and a length of said one or more of said segments is 60 seconds.

9. The method of claim 1, wherein said analyzing comprises comparing normalized statements.

10. The method of claim 9, wherein each normalized statement comprises a statement signature.

11. A system of detecting potential architecture and interfacing issues in a database application, comprising:
    one or more memories configured to store modules comprising:
    a tracing database module having stored therein trace information, said trace information comprising database-related information pertaining to interactions of said database application with a production database; and
    a trace analyzing module that divides said trace information into a plurality of segments, wherein each segment represents a time duration corresponding to a window of time, and wherein said trace analyzing module analyzes statement signatures of statements in each segment within the window of time said segments to determine whether identical or substantially-identical statements were issued by a connection in the window of time, and wherein the window moves from one segment to the next during one or more of said segments, and said statement signatures are computed by assigning numerical values to non-constant statement components and applying said numerical values to a hashing function, to determine potential architecture and interfacing issues in said database application; and
    one or more processors configured to process the modules.

12. The system of claim 11, wherein said trace analyzing module issues a report when a potential architecture and interfacing issue is detected, wherein said report comprises:
    a first part that identifies said detected potential architecture and interfacing issue;

a second part that includes suggestions for solving said detected potential architecture and interfacing issue; and a third part that comprises information identifying code in said database application associated with said detected potential architecture and interfacing issue.

13. The system of claim 11, wherein said trace analyzing module comprises:

a determining module, for determining whether multiple connections were simultaneously blocked on a row of a table in said production database.

14. The system of claim 13, wherein said determining module comprises:

a connection analyzing module, for determining whether at least X connections were simultaneously blocked on said row, and concluding that a potential architecture and interfacing issue exists if it is determined that at least X connections were simultaneously blocked on said row.

15. The system of claim 14, wherein X is greater than 1.

16. The system of claim 11, wherein said trace analyzing module comprises:

join determining module, for determining whether a possible client-side join situation exists.

17. The system of claim 11, wherein said trace analyzing module is configured to determine that potential architecture and interfacing issues exist when at least M identical or substantially-identical statements were issued by a connection during one or more of said segments.

18. The system of claim 17, wherein M is equal to 30, and a length of said one or more of said segments is 60 seconds.

19. The system of claim 11, wherein said trace analyzing module operates by comparing normalized statements.

20. The system of claim 19, wherein each normalized statement comprises a statement signature.

21. An article of manufacture including a non-transitory computer-readable medium having instructions stored thereon that, if executed by a processing device, cause the processing device to perform operations comprising:

accessing a tracing database that comprises trace information, said trace information comprising database-related information pertaining to interactions of said database application with a production database;

dividing said trace information into a plurality of segments, wherein each segment represents a time duration corresponding to a window of time;

analyzing statement signatures of statements in each segment within the window of time said segments to determine whether identical or substantially-identical statements were issued by a connection in the window of time, wherein the window moves from one segment to the next during one or more of said segments, and wherein said statement signatures are computed by assigning numerical values to non-constant statement components and applying said numerical values to a hashing function; and detecting potential architecture and interfacing issues in said database application based on said analyzing.

22. The article of manufacture of claim 21, wherein said analyzing comprises:

issuing a report if a potential architecture and interfacing issue caused due to said statement patterns is detected, wherein said report comprises:

a first part that identifies said detected potential architecture and interfacing issue;

a second part that includes suggestions for solving said detected potential architecture and interfacing issue; and a third part that comprises information identifying code in said database application associated with said detected potential architecture and interfacing issue.

23. The article of manufacture of claim 21, wherein said analyzing comprises:

determining whether multiple connections were simultaneously blocked on a row of a table in said production database.

24. The article of manufacture of claim 23, wherein said determining comprises:

determining whether at least X connections were simultaneously blocked on said row; and concluding that a potential architecture and interfacing issue exists if it is determined that at least X connections were simultaneously blocked on said row.

25. The article of manufacture of claim 24, wherein X is greater than 1.

26. The article of manufacture of claim 21, wherein said analyzing comprises:

determining whether a possible client-side join situation exists.

27. The article of manufacture of claim 21, wherein said analyzing comprises determining that potential architecture and interfacing issues exist when at least M identical or substantially-identical statements were issued by said connection during said one or more of said segments.

28. The article of manufacture of claim 27, wherein M is equal to 30, and a length of said one or more of said segments is 60 seconds.

29. The article of manufacture of claim 21, wherein said analyzing operates by enabling a processor to compare normalized statements.

30. The article of manufacture of claim 29, wherein each normalized statement comprises a statement signature.

31. The method of claim 1, wherein said identical or substantially-identical statements are a plurality of separate statements issued by a user.

32. The method of claim 10, wherein said statement signature is in temporal proximity to another statement signature.

33. The system of claim 11, wherein said identical or substantially-identical statements are a plurality of separate statements issued by a user.

34. The system of claim 20, wherein said statement signature is in temporal proximity to another statement signature.

35. The article of manufacture of claim 21, wherein said identical or substantially-identical statements are a plurality of separate statements issued by a user.

36. The article of manufacture of claim 30, wherein said statement signature is in temporal proximity to another statement signature.

* * * * *